May 29, 1951  O. SASLAW  2,555,247
SEMICONDUCTIVE CELL
Filed July 28, 1949

INVENTOR.
OTTO SASLAW
BY
ATTORNEY

Patented May 29, 1951

2,555,247

UNITED STATES PATENT OFFICE 2,555,247

SEMICONDUCTIVE CELL

Otto Saslaw, Red Bank, N. J., assignor to Vickers Incorporated, Detroit, Mich., a corporation of Michigan Application July 28, 1949, Serial No. 107,342

13 Claims. (Cl. 175—366)

This invention relates to semi-conductive cells and to methods for making them.

Semi-conductive cells for use as rectifiers or photocells usually comprise a thin layer of a semi-conductor, for example, crystalline selenium, on a suitable base or carrier plate of nickel coated aluminum or any conducting material which will not react unfavorably with the semiconductor, and a counterelectrode of metal contacting the surface of the semi-conductor. The counterelectrode is usually formed by spraying a low melting point metal on the surface of the semi-conductor. The term "metal" as used throughout the specification includes elemental metals and alloys. In the series assembling of a plurality of cells to form a stack, they are usually strung on an insulated rod passing through a mounting hole in each cell with either solid or spring contact washers between adjacent cells to make contact between the counterelectrode of one cell and the base plate of an adjacent cell.

One of the problems encountered in the operation of such a series assembly of cells is oxidation of the counterelectrode at high operating temperatures. Oxides of the metal of which the counterelectrode is formed usually have a high specific resistivity to electric currents, thus forming a high resistance joint with the contact washer, and impairing the efficiency of the stack. Operation of the stack in an inert atmosphere could eliminate or reduce oxidation of the counterelectrode, but this would require an expensive and cumbersome structure.

The invention herein substantially eliminates the problem of counterelectrode oxidation by providing a protective cover to the counterelectrode, which cover in a completed stack assembly is in contact with the contact washers. In accordance with one embodiment of the invention, a crystalline selenium layer on a base plate is first sprayed with a low melt metal. Next a surface of a cover plate made from any suitable conductor is sand-blasted and then sprayed with a low melt metal. The sprayed surface of this plate is pressed against the sprayed metal layer on the selenium surface, and the thus assembled cell is then electroformed at currents and voltages generating a relatively high temperature. During the electroforming, the heat fuses the cover to the counterelectrode thereby forming a solid unit and providing a good contact surface for the counterelectrode which will not oxidize at operating temperatures. In addition, the bonded cover plate adds mechanical strength, durability, and protection to the cell and counterelectrode.

It is therefore an object of this invention to provide a new and improved semi-conductive cell and a method for making it.

A further object of the invention is to provide a new and improved counterelectrode for a semi-conductive cell and a method of making it.

Another object of the invention is to provide a new and improved semi-conductive cell having a protective cover on the counterelectrode and a method for making and bonding a protective cover to the counterelectrode of a semi-conductive cell.

Further objects and advantages of the present invention will be apparent from the following description, reference being had to the accompanying drawing wherein a preferred form of the present invention is clearly shown.

Figure 1:
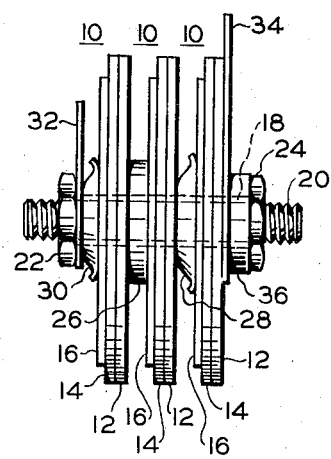
Figure 1 shows customary methods of making contact between adjacent selenium cells in a stack.

Two variations of the ordinary way of making contact between adjacent cells of a series of cells in a rectifier stack are illustrated in Figure 1 in which a partially assembled stack is shown. The individual cells 10, each having a base plate 12, a semi-conductor layer 14, and a counterelectrode 16 are mounted in series on an insulated tube 18 which passes through central apertures formed in the cells. An end-threaded supporting rod 20 extends through the tube 18 and is provided with nuts 22 and 24 for clamping the assembly together. Two types of contact washers 26 and 28 are shown between adjacent cells. These washers make contact between the counterelectrode of one cell and the base plate of an adjacent cell, and are generally made of copper, brass, or bronze. The washer 26 is solid, whereas the washer 27 is a hollow bell-type spring washer as is also the washer 30 making contact with an end terminal 32. Another end terminal 34 is clamped between the base plate of the right hand cell 10 and an insulating washer 36.

At high operating temperatures, the surfaces of the counterelectrodes engaging the contact washers often oxidize, thus forming high resistance joints between the contact washers and the counterelectrodes. Obviously, this impairs the efficiency of the rectifier stack.

Selenium cells are widely used commercially, and for that reason the invention herein is described with selenium cells as examples, although the invention may be practiced in connection with semi-conductive cells utilizing other analogous semi-conductive materials with due consideration being given by those skilled in the art to characteristics peculiar to the particular semi-conductive material used.

In a preferred form of the invention, a surface of a suitable base or carrier plate 12 (Figures 2 and 3) is coated with a semi-conductor 14, for example, selenium. The base 12 may be made of any of the electrical conductors known in the art to be suitable for semi-conductor cell construction, for example, nickel, steel, aluminum, nickeled steel, nickeled aluminum, or any metal or alloy to which the semi-conductor will adhere but which will not react unfavorably with the semi-conductor. The selenium is then converted from its relatively non-conducting, amorphous state to its relatively conducting, crystalline state by a suitable heat treatment after which the selenium surface may be treated by applying lacquer to the surface or by condensing selenium dioxide vapor on the surface of the selenium. There are many other known treatments for the selenium surface which may be used before the counterelectrode is formed. However, the auxiliary surface treatment of the crystalline selenium may be omitted if desired.

Figure 2:
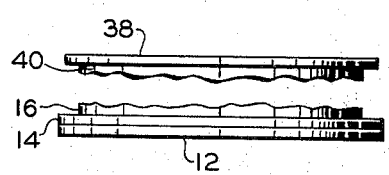
Figure 2 illustrates one step of the invention.
Figure 3:
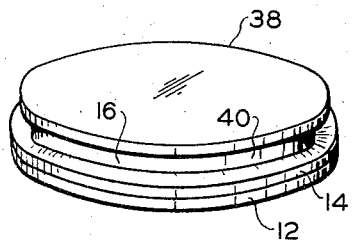
Figure 3 shows a completed cell made in accordance with the invention.

The counterelectrode 16 is formed by applying to the selenium surface, preferably by spraying, a coat of low melting point metal, for example, the fusable eutectic alloy of bismuth, tin, and cadmium with a melting point of 103° C. and known as "Alloy 103." A cover plate 38 made of a suitable conducting material, such as aluminum or other metal, is prepared by applying to one surface thereof, by spraying or any other suitable method, a coating 40 of low melt metal such as used for the counterelectrode, or preferably one having a higher melting point. To provide a better bond, the surface of the cover plate may be etched by sandblasting or other means before the low melt metal is applied thereon. The separate coated plates 12 and 38 are then pressed together as shown in Figure 3 with the surfaces of the metal layers 16 and 40 in intimate engagement. Figure 2 shows the separate plates in close proximity and about to be pressed together. While thus pressed together as indicated in Figure 3, the assembly is electroformed by passing current between the base plate 12 and the cover plate 38. The electroforming currents and voltages should be such that the resultant heat generated during the electroformation will fuse the counterelectrode 16 to the metal layer 40, thereby bonding the cover plate 38 to the counterelectrode 16. If desired, the metal layer 40 may be of metal having a higher melting point than that of the counterelectrode 16. In such a case, the higher melt metal on the cover plate will remain substantially firm and will restrain the metal of the counterelectrode from flowing off the selenium if the temperature during electroformation rises above the melting point of the metal of the counterelectrode 16 but below the melting point of the metal layer 40.

The invention herein is not restricted to any particular metals for the counterelectrode or the coating on the cover plate. There are many low melt metals known to be suitable for semi-conductive cell counterelectrodes. For example, various low melt alloys formed from two or more of the following metals: bismuth, tin, cadmium, lead, and antimony.

While the form of embodiment of the invention as herein disclosed constitutes a preferred form, it is to be understood that other forms might be adopted, all coming within the scope of the claims which follow.

What is claimed is as follows:

1. A method for making a selenium cell having a semi-conducting selenium layer on a conductive base, said method including the steps of spraying a layer of low melt metal on the selenium layer to form a counterelectrode, spraying a layer of low melt metal on a conductive cover plate, pressing together the base and cover plate to intimately engage the counterelectrode with the low melt metal layer of the cover plate, and electroforming the pressed-together assembly at suitable currents and voltages so that the heat due to electroformation will fuse the counterelectrode to the low melt metal layer of the cover plate, thereby bonding the cover plate to the counterelectrode.

2. A method for making a semi-conductive cell having a semi-conductive layer on a conductive base, said method including the steps of applying a counterelectrode of low melt metal on the semi-conductive layer, applying a layer of low melt metal on a conductive cover plate, pressing together the base and cover plate to intimately engage the counterelectrode with the low melt metal layer on the cover plate, and electroforming the pressed together assembly at suitable currents and voltages so that the heat due to electroformation will fuse the counterelectrode to the low melt metal of the cover plate, thereby bonding the cover plate to the counterelectrode.

3. A method for making a semi-conductive cell having a semi-conductive layer on a conductive base, said method including the steps of spraying a layer of low melt metal on the semi-conductive layer to form a counterelectrode, spraying a layer of low melt metal on a conductive cover plate, pressing together the base and cover plate to intimately engage the counterelectrode with the low melt metal layer on the cover plate, and electroforming the pressed-together assembly at suitable currents and voltages so that the heat due to electroformation will fuse the counterelectrode to the low melt metal of the cover plate, thereby bonding the cover plate to the counterelectrode.

4. A method for bonding a conductive cover plate to a low melt metal counterelectrode on the semi-conductive selenium layer of a selenium cell, said method comprising applying a layer of low melt metal on a surface of the cover plate, compressively engaging the counterelectrode with the surface of the low melt metal on the cover plate, and while thus compressed, electroforming the assembly at suitable currents and voltages to generate heat sufficient to fuse the counterelectrode to the low melt metal on the cover plate, thereby bonding the cover plate to the counterelectrode.

5. A method for bonding a conductive cover plate to a low melt metal counterelectrode on the semi-conductive layer of a semi-conductive cell, said method comprising applying a low melt metal to a surface of the cover plate, compressively engaging the counterelectrode with the surface of the low melt metal on the cover plate, and while thus compressed, electroforming the assembly at suitable currents and voltages to generate heat sufficient to fuse the counterelectrode to the low melt metal on the cover plate, thereby bonding the cover plate to the counterelectrode.

6. A method for bonding a conductive cover plate to a low melt metal counterelectrode on the semi-conductive layer of a semi-conductive cell, said method comprising spraying a low melt metal to a surface of the cover plate, compressively engaging the counterelectrode with the surface of the low melt metal on the cover plate, and while thus compressed, electroforming the assembly at suitable currents and voltages to generate heat sufficient to fuse the counterelectrode to the low melt metal on the cover plate, thereby bonding the cover plate to the counterelectrode.

7. A method for making a semi-conductive cell including the steps of applying a coat of low melt metal on the surface of a semi-conductor on a conductive base, etching a surface of a conductive plate, applying a coat of low melt metal to said etched surface, pressing together the coated conductive base and the coated conductive plate with the low melt metal-coated surfaces adjacent to each other, and while thus pressed together, electroforming the unit at suitable currents and voltages to generate heat sufficient to fuse the low melt metals and thereby integrate the unit.

8. A method for making a semi-conductive cell including the steps of spraying a coat of low melt metal on the surface of a semi-conductor on a conductive base, spraying a coat of low melt metal on a surface of a conductive plate, pressing together the coated conductive base and the coated conductive plate with the low melt metal-coated surfaces adjacent to each other, and while thus pressed together, electroforming the unit at suitable currents and voltages to generate heat sufficient to fuse the low melt metals, and thereby integrate the unit.

9. A method for making a semi-conductive cell including the steps of applying a coat of low melt metal to the surface of a semi-conductor on a conductive base, applying a coat of low melt metal to a surface of a conductive plate, pressing together the coated conductive base and the coated conductive plate with the low melt metal-coated surfaces adjacent to each other, and while thus pressed together, electroforming the unit at suitable currents and voltages to generate heat sufficient to fuse the low melt metals, and thereby integrate the unit.

10. A method for making a protectively covered counterelectrode for a semi-conductive layer on a conductive base, said method comprising applying a coat of low melt metal on the surface of the semi-conducting layer, applying a coat of low melt metal on a surface of a conductive plate, pressing the low melt metal-coated surfaces together, and while thus pressed together, electroforming the assemblage at currents and voltages that will generate heat sufficient to fuse the low melt metals, thereby to integrate the assembled unit.

11. A method for bonding a conductive cover plate to a low melt metal counterelectrode on the semi-conductive selenium layer of a selenium cell, said method comprising etching a surface of the cover plate, spraying a layer of low melt metal on the etched surface of the cover plate, compressively engaging the counterelectrode with the surface of the low melt metal on the cover plate, and while thus compressed, electroforming the assembly at suitable currents and voltages to generate heat sufficient to fuse the counterelectrode to the low melt metal on the cover plate, thereby bonding the cover plate to the counterelectrode.

12. A method for bonding a conductive cover plate to a low melt metal counterelectrode on the semi-conductive layer of a semi-conductive cell, said method comprising etching a surface of the cover plate, applying a low melt metal on the etched surface of the cover plate, compressively engaging the counterelectrode with the surface of the low melt metal on the cover plate, and while thus compressed, electroforming the assembly at suitable currents and voltages to generate heat sufficient to fuse the counterelectrode to the low melt metal on the cover plate, thereby bonding the cover plate to the counterelectrode.

13. The method of bonding a protective metal cover plate having an adherent low melt metal coating on a surface thereof to a low melt metal counterelectrode of a semi-conductive cell, said method comprising pressing together into intimate engagement the surface of the counterelectrode and the low melt metal coating of the cover plate, and electroforming the cell with suitable currents and voltages which will generate heat sufficient to fuse the counterelectrode to the metal coating of the cover plate, thereby to bond the cover plate to the counterelectrode.

OTTO SASLAW.

REFERENCES CITED

The following references are of record in the file of this patent:

UNITED STATES PATENTS

| Number | Name | Date |
| --- | --- | --- |
| 2,137,316 | Van Geel et al. | Nov. 22, 1938 |
| 2,162,487 | Lotz | June 13, 1939 |
| 2,437,336 | Thompson et al. | Mar. 9, 1948 |